United States Patent Office 3,337,191
Patented Aug. 22, 1967

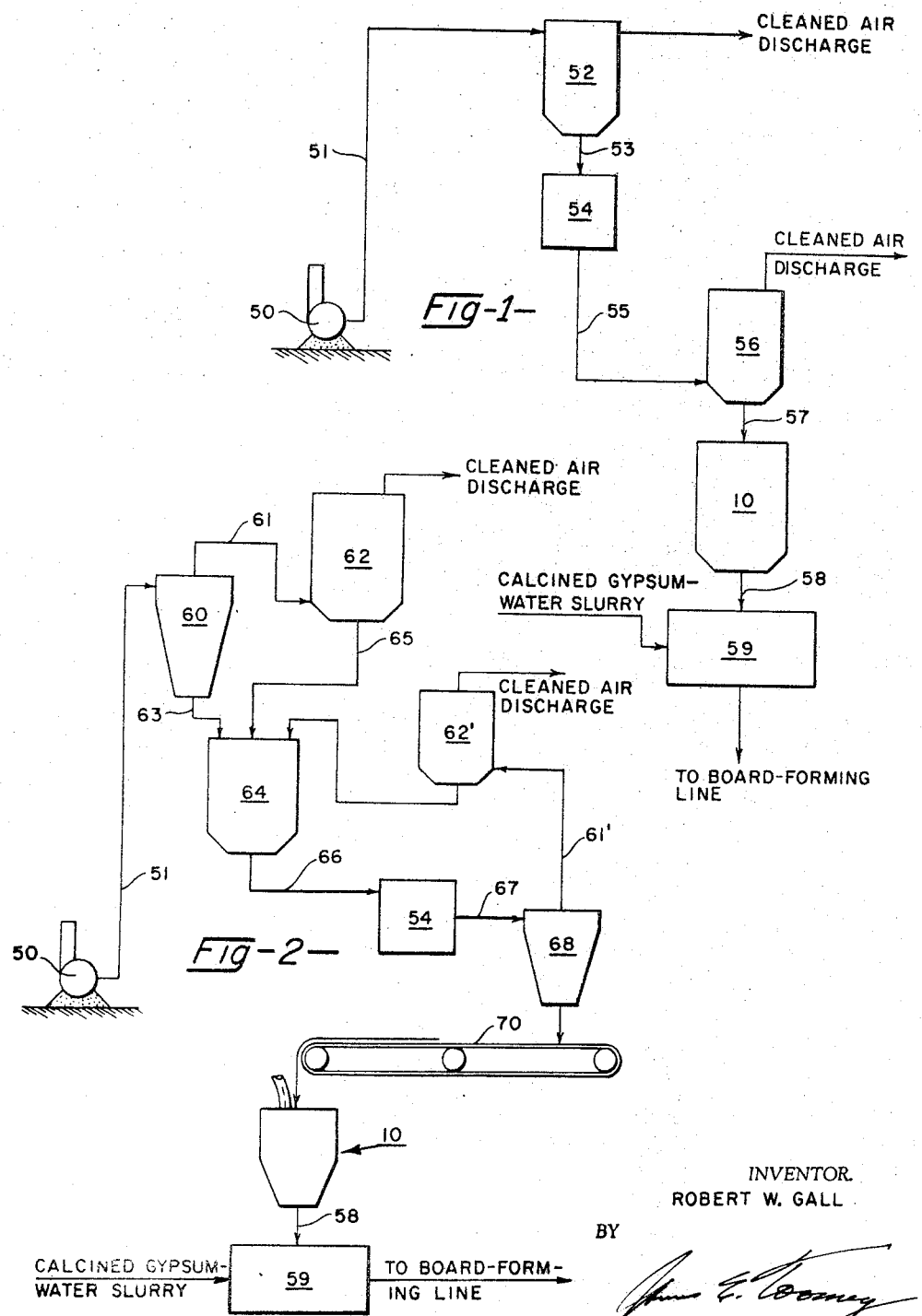

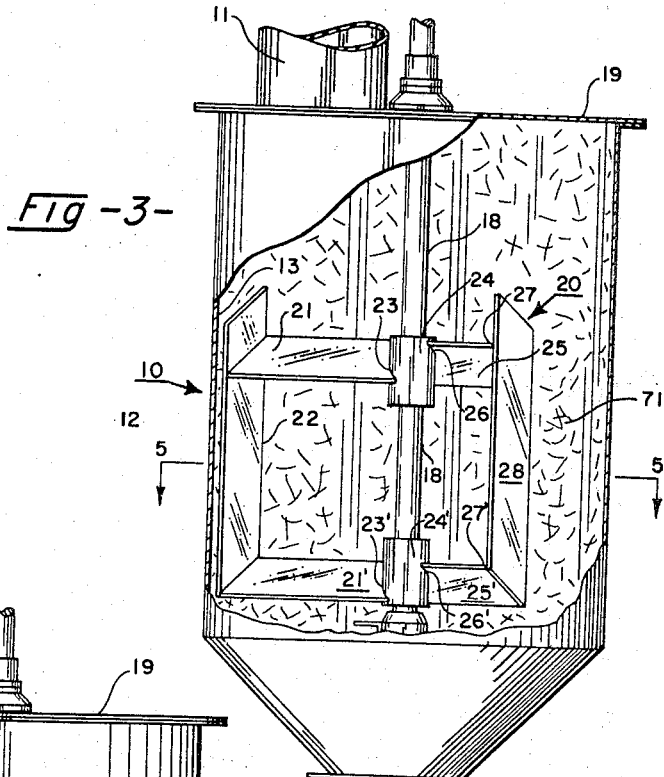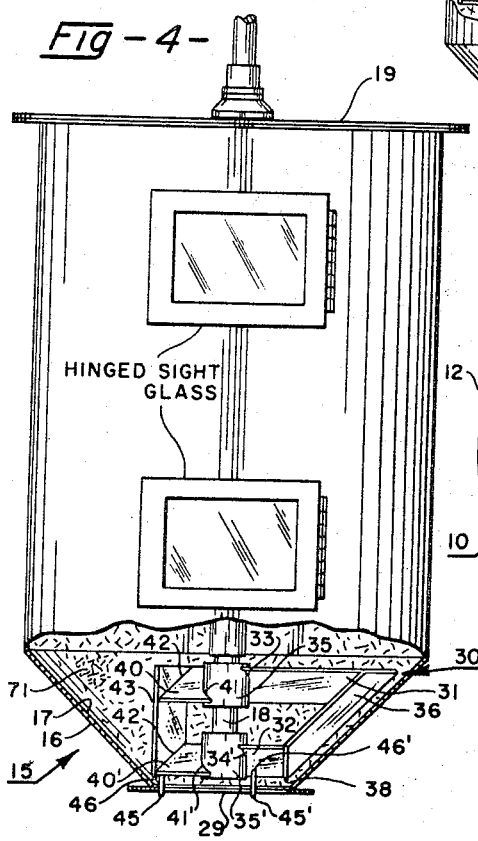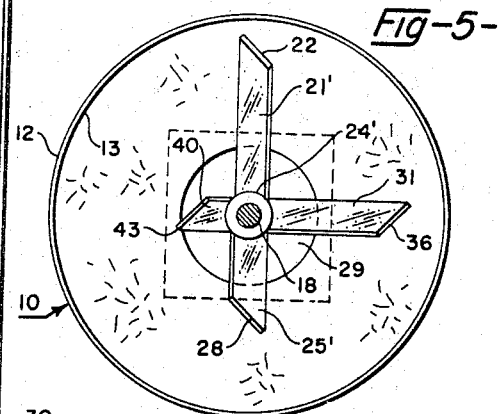

3,337,191
APPARATUS FOR MIXING
Robert W. Gall, Long Beach, Calif., assignor to Kaiser Gypsum Company, Inc., Oakland, Calif., a corporation of Washington
Original application Feb. 17, 1964, Ser. No. 345,364, now Patent No. 3,314,613. Divided and this application July 18, 1966, Ser. No. 578,912
7 Claims. (Cl. 259—7)

This application is a division of my prior application Ser. No. 345,364, filed Feb. 17, 1964, now Patent No. 3,314,613.

In the production of gypsum products, such as gypsum cast articles, or wallboard or tile, and for instance in the production of paper-covered gypsum-core board, it is customary in the industry to add a set-control agent. In the production of such products, raw gypsum rock, which is fully hydrated calcium sulfate, $CaSO_4 \cdot 2H_2O$, in most instances, is calcined to form the calcium sulfate hemihydrate, $CaSO_4 \cdot \frac{1}{2}H_2O$, and this is then admixed with water to form a plastic slurry, formed into the desired shape, either as a cast object or in the form of a board, and then hardened in the desired form, and is dried and is then ready for use. It is generally found that the calcined gypsum-water slurry sets, that is, forms interlaced gypsum crystals of fully hydrated calcium sulfate, $CaSO_4 \cdot 2H_2O$, in a time period which is undesirable. In many instances this setting time is too slow and therefore an accelerator is added which increases the rate of set so that the final hardened product is obtainable in a reasonable amount of time in the usual industrial production line. The difficulties of uniform feed or introduction of such set-control agent into the gypsum slurry in industrial practice has restricted the types of accelerator which can be usefully employed, and has resulted in substantial costs to the industry.

According to the present invention, it has now been discovered that comminuted preformed paper-covered gypsum-core board can be uniformly introduced into fresh amounts of calcined gypsum-water plastic slurry to ensure excellent control of the setting characteristics of such slurry when the slurry is cast into shape, then hardened and dried. Such a cast shape can be a paper-covered gypsum-core board. In a particular manner, the invention enables a practical and economical board-forming operation, on an industrial scale, employing such comminuted material as set-control agent. According to this invention such preformed gypsum board is comminuted, the comminuted particles are suspended in a gas, preferably air, and the resulting suspension is introduced into a separator zone. In this latter zone, the solids particles are removed from the suspension and are separately recovered, while cleaned gas, e.g. air, goes off and is discharged. In one advantageous embodiment the larger particles are first removed by centrifugal force, for instance, by subjecting the suspension to cyclonic motion in a cyclone separator of conventional design, and are separately recovered, while the dust-laden gas issuing from this first separator zone or cyclone separator is taken off and conveyed to a second separator zone where the dust is separately recovered from the gas, in any desired manner. The recovered dust and the larger particles which have been recovered are then mixed together and the admixture is finely ground to form the desired finely divided set-control agent or accelerator for a calcined gypsum-water slurry. This accelerator or agent is conveyed to a holding tank or storage zone and is agitated in this zone to maintain the admixture in constant motion, that is, in freely mobile state. It is advantageous to so agitate in the presence of a gas, such as air, e.g. in a container which is only partially filled with the solid particles, leaving an air space or freeboard thereabove.

In the first comminuting step, there can be recovered, for example, the particles which are formed by sawing pre-formed boards as described herein to size or sawing to trim the finished board. Alternatively, in this zone culls or broken pieces of such finished board from a previous operation are comminuted, suitably to particles of minus $\frac{1}{8}$ inch in diameter. Particles so obtained are taken up or suspended in a gas, preferably air, and are conveyed to a separating zone. In one advantageous operation, the first separator is a cyclone separator wherein the suspension of particles in air are subjected to cyclonic motion, that is to centrifugal separation, whereby the larger particles are withdrawn separately from the gas or air, the latter still containing the smaller or dust particles in suspension. The dust particles are then separated from the gas and this is suitably done by conveying the dust-laden gas to a bag-house where the dust-laden gas enters adjacent the base of an enclosure in which filter bags are hung in the known manner, and passes upwardly, the dust particles being removed on the filters and cleaned gas going off from the top of the enclosure. At intervals the bag filters are shaken and the dust particles fall to the base where they are withdrawn. The withdrawn dust particles and the larger particles which had been removed in the cyclone separator or otherwise as desired, are then preferably introduced into a mixing zone where they are mixed together. The admixture of dust and particles is conveyed to a further grinding zone where the whole mixture is ground to a more uniformly fine particle size, preferably to minus 100 mesh. This is suitably a closed circuit grinding zone. It will be understood that the material derived from the paper-covered gypsum-core boards and so recovered and ground comprises particles of set gypsum core and paper fibers. It will also be understood that the board can include and usually includes, besides the set gypsum crystals, small amounts of additives such as are common in this art, for example, starch or other adhesives, expanded perlite, glass fibers, asbestos fibers, waste sulfite liquor or other additives common in this art or any desired admixture of these additives, in the usual amounts.

The finely ground admixture of such gypsum core material and paper fibers is very advantageous for introduction into fresh amounts of calcined gypsum-water slurry to act therein as a set-control agent, or accelerator. It is a particular advantage that the amount of accelerator is substantially reduced when finely divided preformed board of this type is employed as such agent. It has been found that, whereas about 47 lbs. of raw gypsum particles and 8 lbs. of potash ($K_2CO_3$) are normally required per 1000 sq. ft. of board produced, the process according to the present invention enables production of excelent board with the incorporation of only about 29 lbs. finely ground accelerator agent made as described herein and about 0.8 lb. potash.

This admixture of gypsum particles and paper fibers packs into a dense, immobile mass very readily and when placed in a storage tank or bin is very difficult to discharge therefrom because of interlacing of the fibers and packing and bridging. According to the present invention this finely divided material is now conducted to a container wherein it is maintained in continuous agitation, or is continuously agitated, in order to maintain the mass in freely mobile state; and in this manner there is enabled a uniform and continuous feeding or introduction into fresh amounts of calcined gypsum-water slurry.

The accompanying drawings illustrate some modes of carrying out the process of this invention and one embodiment of the apparatus of this invention; and in these drawings:

FIGURE 1 is a flow sheet of one suitable mode of practicing the invention.

FIGURE 2 is a flow sheet of a further mode of practicing the invention.

FIGURE 3 is a vertical view of one embodiment of a holding and feeding device according to the present invention, partly broken away to show a section of the upper portion thereof.

FIGURE 4 is a vertical view of the embodiment shown in FIGURE 3 taken at right angles to that view, partly broken away and showing in section the base position thereof; and FIGURE 5 is a horizontal sectional view of the device in FIGURES 3 and 4, taken on line 5—5 of FIGURE 3.

With reference to the drawings, a container 10 receives the finely ground accelerator through inlet pipe or conduit 11. The container 10 comprises a generally tubular upper portion 12, made of any suitable material, for example, steel, having inner surface 13 and outer surface 14. In the figures, tubular portion 12 is vertically disposed and at its base and integral with the tubular portion is outlet element 15 in the form of an inverted cone, having a conical wall 16, the inner surface of which is designated at 17. Disposed axially within container 10, extending through tubular portion 12 and terminating adjacent the base or narrowest portion of conical outlet element 15, is rotatable shaft 18 which in this embodiment extends upwardly through top 19 of tubular portion 12 and is operated by any convenient or conventional motor (not shown). Within the tubular element 12 and suitably, in this embodiment, disposed in about the lower two-thirds of element 12, is an agitating device indicated generally at 20. This device comprises blades or vanes 21 and 21' which extend generally horizontally along their axes outwardly from shaft 18 to adjacent the inner surface 13 of tubular element 12. Connected to the outer ends of blades 20, 21' and extending therebetween is vertical blade 22. At their respective inner ends 23, 23', blades 21 and 21' are affixed to shaft 18, suitably by welding to sleeves 24, 24' respectively. Blades 21 and 21' are spaced from each other along shaft 18. In an advantageous arrangement, these blades are spaced from each other at a distance of one-third to two-thirds the height of tubular portion 12, and in the embodiment shown in FIGURE 3 are spaced from each other about ½ the height of tubular element 12.

A second pair of blades 25, 25' are disposed in like manner on shaft 18, i.e. suitably by welding at their inner ends 26, 26' to sleeves 24, 24'. In the embodiment shown the sleeves are keyed to the shaft but this connection can be effected in any desired manner. Blade 25 is spaced from blade 21, and blade 25' is likewise spaced from blade 21', respectively in planes perpendicular to the axis of shaft 18. In an advantageous embodiment, as shown in FIGURE 3, blades of an opposing pair of blades, for instance blades 25 and 21, are disposed on the shaft at 180° from, or opposite to, each other. Blades 25 and 25' extend outwardly from shaft 18 a distance less than that of blades 21, 21' respectively. Suitably, blades 25, 25' are of lengths equal to from ¼ to ¾ the length of blades 21, 21' respectively and in one advantageous embodiment, as shown in FIGURE 2, blades 25 and 25' are about half the length of blades 21, 21' respectively. At the outer ends 27, 27' respectively of blades 25, 25' there is disposed vertical blade 28 which extends between the two outwardly extending blades 25, 25' and can extend a greater distance if desired. Likewise, blade 22 can extend vertically a greater distance than the space between blades 21, 21' respectively, if desired. As can be seen from FIGURE 3, the blades are adapted to pass through and break down any packing and bridging both vertically and horizontally and at various locations throughout the radius of the container. It will be understood, although only two pairs of horizontal blades and one pair vertical blades are shown, there can be employed more than two pairs of horizontal blades and further vertical blades can also be employed. The geenrally horizontally extending blades 21, 21', 25 and 25' are suitably flat blades of greater length than width and of greater width than thickness. In a preferred embodiment they are installed in such manner that in the direction of its width, each blade is disposed or inclined at a slight angle to the horizontal, preferably at an angle of less than 45° thereto. In a preferred embodiment also, opposite blades, e.g. 21 and 25, are disposed oppositely, or inclined in opposite directions, at like angles to the horizontal.

For best operation a similar agitating device 30 is also installed within inverted conical base 15 which latter is provided at its bottom or lowermost portion with outlet 29. In device 30 there are provided blades 31 and 32 extending outwardly from shaft 18 and affixed thereto in this embodiment by welding at their respective inner ends 33 and 34 to sleeves 35, 35'. In the conical base the outwardly extending blades of one pair of blades, that is, in this embodiment blades 31 and 32, extend outwardly from the shaft to adjacent the inner surface 17 of conical wall 16, and disposed at the outer ends of blades 31 and 32, generally parallel to wall 16, is blade 36 which is affixed to outer ends 37 and 38 of blades 31 and 32 respectively. Blades 31 and 32 are suitably spaced from each other vertically, for example, to a distance of from one-third to two-thirds the total height of conical base 15. Other spacings of these blades, as desired, can be employed.

Spaced horizontally from blades 31 and 32 are a further pair of blades 40 and 40', which extend outwardly from shaft 18. Lower blade 40', that is, the blade which is adjacent or closer to the outlet of the conical element, in the embodiment shown is substantially of the same length or outward extension from shaft 18 as blade 32, both of these blades being disposed in approximately the same horizontal plane and horizontally spaced from each other. Upper blade 40, which is in substantially the same horizontal plane as blade 31 and is spaced therefrom, extends outwardly from shaft 18 and is of a length less than that of blade 31; and in a preferred embodiment is of substantially the same length as lower blade 40', that is the blade adjacent the outlet of the conical portion. A vertical blade 43 extends between blades 40 and 40' at the outer extremities thereof and is connected to each blade at its end or terminal surface. As more clearly shown in FIGURE 5, the blades of the agitator in the conical base preferably extend horizontally at about right angles, or 90°, to those of the agitator in the upper portion of the device. However, this angular displacement can be varied as desired. Also, the opposite blades in a pair of blades, e.g. 21, 25, can be vertically spaced from each other but preferably extend axially in substantially the same horizontal plane. To assist in discharge of material from 10 when it contains the accelerator material 71, short vertical rods 45, 45', if desired, are welded at 46, 46' to the lower surfaces of lowermost blades 40', 32, respectively, extending downwardly through opening 29 as the agitator 30 is rotated by shaft 18, and assisting in forcing accelerator outwardly.

As an example of one mode of carrying out the process of this invention according to the flow sheet of FIGURE 1, an amount of preformed, gypsum-core, paper-covered board is comminuted in breaker device 50, of any desired type, to substantially entirely pass through a ⅛ inch screen; and the comminuted product is pneumatically conveyed in an air stream through line 51 to separator zone 52, which can suitably be a baghouse of conventional design wherein the solids are separated from the air, the cleaned air going off as indicated and the solids being conveyed likewise pneumatically, through 53 to a grinding zone 54. In the grinding zone, the particles are further ground to substantially all passing 100 mesh;

and are then conducted in an air stream pneumatically through line 55 to separator zone 56, which is also suitably a baghouse wherein the solids are filtered from the air and cleaned air goes off as indicated. The filtered solids are then conducted, suitably by a conveyor belt, if desired, at 57 to container 10 wherein they are kept in constant motion and freely mobile. Suitably, in a preferred embodiment, a substantial freeboard is maintained in 10 above the top of the agitated solids. From 10 the freely mobile solids are withdrawn at 58 and fed into mixing zone 59 where they are incorporated in the plastic calcined gypsum-water slurry and thereafter fed to the board line as indicated.

As another example of the operation of the process of the invention, reference is made to the flow sheet of FIGURE 2. An amount of preformed paper-covered gypsum-core wallboard, including culls or sawn pieces, is placed in the breaker or comminuter 50 where they are broken and comminuted to particles substantially entirely passing 1/8 inch mesh screen. The ground material is pneumatically conveyed through the line 51 to cyclone separator 60 where the larger pieces are withdrawn at the bottom through line 63 and brought into mixing zone 64. The gas-laden air is drawn off at the top of the cyclone device and conveyed at 61 to a bag filter chamber 62 where the suspension is filtered through cloth bags; and cleaned air is discharged at the top, and the dust recovered on the bag filters is removed at the bottom through line 65 and conducted to chamber 64 where it is mixed together with the larger particles and the admixture is conveyed along element 66 which is suitably a conveyor belt, to a grinding zone 56 where substantially all of the material is reduced to minus 100 mesh. The ground material from grinding zone 56 in pneumatically conveyed through line 67 to a further cyclone separator 68 where a major portion of the solid particles are withdrawn at the bottom as solid product and dust-laden gas goes off through line 61' and is preferably also recycled to bag filters 62' to recover the dust contained therein, recycling the latter to mixing zone 64.

The solids coming off at the bottom of cyclone 68 are fed to a conveyor belt 70 and then into container 10 which in this example of the construction shown in FIGURES 3, 4 and 5, wherein the accelerator particles are kept in constant motion and in freely mobile state. As desired, the accelerator is drawn off through line 58 and fed to mixing zone 59 into which calcined gypsum-water slurry is also introduced and from which the slurry is fed to the board-forming line in the conventional manner.

It will be understood that the above specific description and drawings have been given for purposes for illustration only and that variations and modifications can be made therein without departing from the spirit and scope of the appended claims. In the drawings, like parts are given like numbers, for convenience.

In an advantageous embodiment, blades of an opposing pair of blades, e.g., of a pair in the same horizontal axial plane, are disposed opposite to or at 180° from each other. Suitably each of the blades is of substantially the same width as each other blade, although the widths can vary, if desired.

Having now described the invention,
What is claimed is:

1. In a device for storing and uniformly discharging an admixture of comminuted gypsum particles and paper fibers a container comprising,
 (a) a tank having a main tubular body of circular cross-section,
 (b) a conical base integral with said tubular body,
 (c) inlet and outlet means,
 (d) a rotatable shaft disposed axially within said body,
 (e) an agitator device disposed within said tubular body and comprising,
 (f) a first pair of blades extending outwardly from said shaft and spaced from each other along said shaft, each blade being affixed at one end to said shaft and terminating at its outer end adjacent the inner surface of said tubular body,
 (g) a third blade disposed adjacent said inner surface between and connected to the outer ends of said outwardly extending blades,
 (h) a second pair of shorter blades extending outwardly from said shaft and spaced from each other along said shaft,
 (i) said second pair of blades extending outwardly from about one-fourth to three-fourths the length of said first pair of outwardly extending blades and spaced from said first pair of blades in a plane perpendicular to the axis of said shaft, and
 (j) a blade extending between and connected to the outer ends of said second pair of outwardly extending shorter blades.

2. In a device for storing and uniformly discharging an admixture of comminuted gypsum particles and paper fibers, a container comprising,
 (a) a main tubular body of circular cross-section,
 (b) a conical base integral with said tubular body,
 (c) an inlet means in said main tubular body and an outlet means in said conical base,
 (d) a rotatable shaft disposed axially within said body,
 (e) a first pair of blades spaced from each other and extending outwardly from said shaft to adjacent the inner surface of said tubular body, each of said blades being disposed along its width at an angle to the axis of said shaft and affixed to said shaft,
 (f) a blade disposed adjacent said inner surface and connected to the outer ends of said first pair of blades,
 (g) a second pair of blades extending outwardly from said shaft and spaced from each other,
 (h) said second pair of blades extending outwardly from said shaft from about one-fourth to three-fourths the length of said first pair of outwardly extending blades,
 (i) each of said second pair of blades being affixed to the shaft and disposed along its width at an angle to the axis of such shaft,
 (j) a blade extending parallel to the axis of said shaft and connected to the outer end of each of said second pair of blades.

3. In a device for introducing into a calcined gypsum-water slurry an admixture of comminuted gypsum particles and paper fibers a container comprising,
 (a) a vertical main tubular body of circular cross-section,
 (b) a conical base integral with said tubular body,
 (c) inlet means in said main tubular body and outlet means in said conical base,
 (d) a vertical rotatable shaft disposed axially within said body,
 (e) a first pair of blades extending horizontally from said shaft and terminating adjacent the inner surface of said tubular body, each of said blades being affixed to said shaft and disposed along its width at an angle to the axis thereof,
 (f) a blade disposed adjacent said inner surface and generally parallel to the axis of said tubular body and connected to the outer ends of said horizontally extending blades,
 (g) a second pair of blades extending generally horizontally from said shaft and affixed thereto,
 (h) said second pair of blades being spaced from each other and terminating at a distance of from about one-fourth to three-fourths the length of said first pair of blades,
 (i) a blade extending generally parallel to the axis of said shaft and connected to the outer ends of said second pair of horizontally-extending blades.

4. Container for storing and uniformly discharging an admixture of comminuted gypsum particles and paper fibers comprising,
   (a) vertical main tubular body of circular cross-section,
   (b) a conical base integral with said tubular body,
   (c) inlet means in said main tubular body and outlet means in said conical base,
   (d) a vertical rotatable shaft disposed axially within said body,
   (e) a first pair of blades extending horizontally from said shaft and terminating adjacent the inner surfaces of said tubular body, each of said blades being spaced from each other along and affixed to said shaft,
   (f) each blade being disposed along its width at an angle to the axis of said shaft,
   (g) a blade disposed adjacent said inner surface and generally parallel to the axis of said tubular body and connected to and extending between the outer ends of said horizontally extending blades,
   (h) a second pair of blades extending generally horizontally from said shaft and affixed thereto and spaced from each other along said shaft,
   (i) said second pair of blades extending outwardly from said shaft a lesser distance than the length of said first pair of blades,
   (j) a blade extending generally parallel to the axis of said shaft and extending between and being connected to the outer ends of said second pair of blades.

5. A container for storing and uniformly discharging an admixture of comminuted gypsum particles and paper fibers comprising,
   (a) a main vertical tubular body of circular cross-section,
   (b) a base in the form of an inverted cone integral with said tubular body,
   (c) inlet means in said main tubular body and outlet means disposed at the bottom of said conical base,
   (d) a rotatable shaft disposed axially within said body,
   (e) a first pair of horizontal blades disposed within said tubular body and spaced from each other along said shaft, each of said blades being affixed at one end to said shaft and terminating at its outer end adjacent the inner surface of said tubular body,
   (f) a vertical blade disposed adjacent said inner surface between and connected to the outer ends of said horizontal blades,
   (g) a second pair of horizontal blades extending from said shaft and spaced from each other along said shaft,
   (h) said second pair of blades extending outwardly from about one-fourth to three-fourths of the length of said first pair of horizontal blades,
   (i) a vertical blade extending between and connected to the outer ends of said second pair of horizontal pair of blades,
   (j) a third pair of horizontal blades extending outwardly from and affixed at their inner ends to said rotatable shaft and being spaced from each other along said shaft and disposed within said conical base, each of said third pair of blades terminating adjacent the inner surface of said base,
   (k) a blade extending generally parallel to the wall of said conical base and affixed to the outer ends of said last mentioned pair of horizontal blades,
   (l) a fourth pair of blades in said base and extending outwardly from said vertical shaft and affixed thereto, at least one of said last mentioned pair of blades extending outwardly from said shaft less than the distance between said shaft and the wall of said base,
   (m) a blade extending between and affixed to the ends of said fourth pair of blades.

6. A container for storing and uniformly discharging an admixture of comminuted gypsum particles and paper fibers comprising,
   (a) a main vertical tubular body of circular cross-section,
   (b) a base in the form of an inverted cone integral with said tubular body,
   (c) inlet means in said main tubular body and outlet means disposed at the bottom of said conical base,
   (d) a rotatable shaft disposed axially within said body,
   (e) a first pair of horizontal blades disposed within said tubular body and spaced from each other along said shaft, each of said blades being affixed at one end to said shaft and terminating at its outer end adjacent the inner surface of said tubular body,
   (f) a vertical blade disposed adjacent said inner surface between and connected to the outer ends of said horizontal blades,
   (g) a second pair of horizontal blades extending from said shaft and spaced from each other along said shaft,
   (h) said second pair of blades extending outwardly from about one-fourth to three-fourths of the length of said first pair of horizontal blades,
   (i) a vertical blade extending between and connected to the outer ends of said second pair of horizontal pair of blades,
   (j) a third pair of horizontal blades extending outwardly from and affixed at their inner ends to said rotatable shaft and being spaced from each other along said shaft and disposed within said conical base, each of said third pair of blades terminating adjacent the inner surface of said base,
   (k) a blade extending generally parallel to the wall of said conical base and affixed to the outer ends of said last mentioned pair of horizontal blades,
   (l) a fourth pair of blades extending outwardly from said vertical shaft and being affixed thereto and spaced from each other along said shaft, the uppermost of said fourth pair of blades extending outwardly less than the length of the uppermost of said third pair of blades,
   (m) a blade extending between and affixed to the ends of said fourth pair of blades.

7. A container for storing and uniformly discharging an admixture of comminuted gypsum particles and paper fibers comprising,
   (a) a main vertical tubular body of circular cross-section,
   (b) a base in the form of an inverted cone integral with said tubular body,
   (c) an inlet means in said main tubular body and an outlet means in said base,
   (d) a rotatable shaft disposed axially within said body,
   (e) a first pair of horizontal blades disposed within said tubular body and spaced from each other vertically along said shaft, each of said blades being affixed at one end to said shaft and terminating at its outer end adjacent the inner surface of said tubular body,
   (f) a vertical blade disposed adjacent said inner surface between and connected to the outer end of said horizontal blades,
   (g) a second pair of horizontal blades extending from said shaft, spaced from each other along said shaft, said second pair of blades being disposed at 180° from said first pair of blades,
   (h) said second pair of blades extending outwardly about one-half the length of said first pair of horizontal blades,
   (i) a vertical blade extending between and connected to the outer ends of said second pair of horizontal blades,
   (j) a third pair of blades extending outwardly from and affixed at their inner ends to said rotatable shaft and being spaced from each other along said shaft and disposed within said base, each of said third pair of blades terminating adjacent the inner surface of said base, (k) a blade extending generally parallel to the wall of said base and affixed to and extending between the outer ends of said last mentioned pair of horizontal blades, (l) a fourth pair of blades in said base disposed on said shaft at 180° from said third pair of blades and being spaced from each other along said shaft, and including an uppermost blade and a lowermost blade, (m) the uppermost of said fourth pair of blades extending horizontally from said shaft about one-half the distance to the wall of said base, the lowermost of said fourth pair of blades extending to adjacent the wall of said base, (n) a blade extending between and affixed to the ends of said fourth pair of blades.

References Cited
UNITED STATES PATENTS

| | | | |
|---|---|---|---|
| 474,989 | 5/1892 | Hammill | 259—134 |
| 816,887 | 4/1906 | Snigo | 259—134 |
| 2,498,125 | 2/1950 | Knudsen et al. | 259—8 |
| 3,197,180 | 7/1965 | Bates | 259—7 |

WALTER A. SCHEEL, *Primary Examiner.*

R. W. JENKINS, *Assistant Examiner.*